Feb. 19, 1952   E. A. HARTY   2,586,539
METAL RECTIFIER ASSEMBLY
Filed Sept. 4, 1947
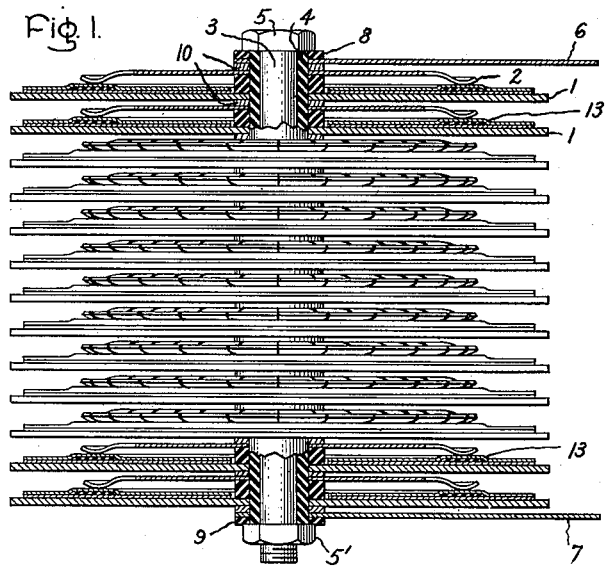
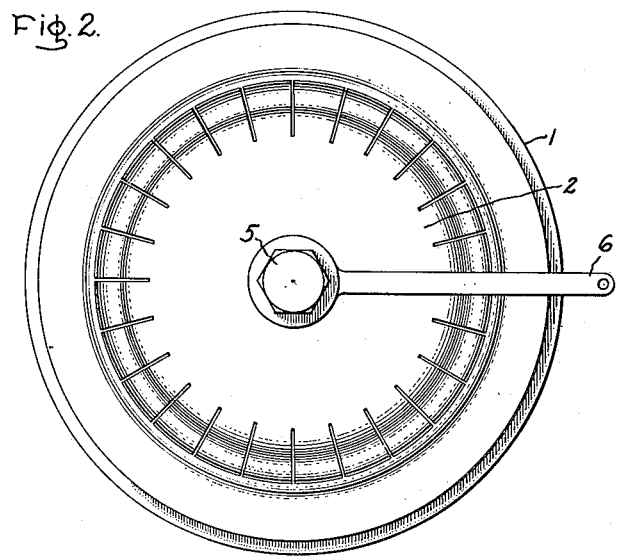
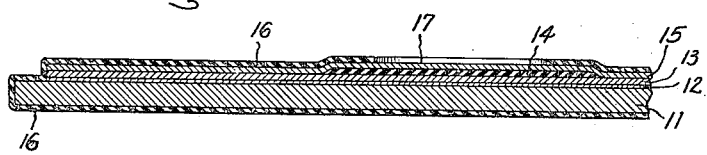
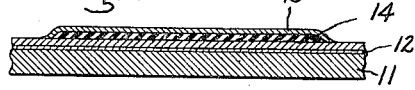
Inventor:
Edgar A. Harty.
by *Harry E. Dunham*
His Attorney.

Patented Feb. 19, 1952

2,586,539

UNITED STATES PATENT OFFICE 2,586,539

METAL RECTIFIER ASSEMBLY

Edgar A. Harty, Marblehead, Mass., assignor to General Electric Company, a corporation of New York Application September 4, 1947, Serial No. 772,127

4 Claims. (Cl. 175—366)

The present invention relates to the structure of metal rectifiers and particularly to selenium rectifiers. Its object is to provide a contact-making construction for one or more rectifier plates which will provide stable characteristics and reliable operation.

Metal rectifiers which operate by virtue of an asymmetric transition resistance through a metallic film are subject to variations of rectifying characteristics when the rectifying film is subjected to pressure. For example, a selenium rectifier consists essentially of a film of selenium which is maintained in sandwiched relation between oppositely disposed electrodes. It has been found that pressure exerted by contact-making devices produces an undesirable increase of reverse current through the selenium layer. Difficulty also has been experienced otherwise by localized pressure contacts. For example, defective spots in a rectifier normally tend to be cleared automatically by the defective spot being burned out and volatilized by temporary short-circuiting current therethrough. A localized contact under pressure tends to trap otherwise volatilizable conductive material and thus prevents proper clearing of a defective spot.

In accordance with my present invention, such difficulties are overcome and positive advantages are obtained by a construction providing an insulating barrier layer imbedded in one of the juxtaposed electrodes. Such barrier preferably is located adjacent to and preferably coextensive with the incidence of the contact pressure on the layer of selenium or other rectifying material.

The accompanying drawing, Fig. 1 is a side view of a stack of rectifier plates and spring contacts; Fig. 2 is an end view of such a stack and Figs. 3 and 4 are magnified cross-sections of the pressure-receiving portions of rectifier cells embodying my invention.

As shown in Fig. 1 a stack of plate-shaped rectifier cells 1 and intervening springy contact plates 2 are assembled on a spindle 3. The rectifier cells are insulated from the spindle 3 by an insulating sleeve 4. They are held in stack-assembled relation by the nuts 5, 5'. Terminal strips 6, 7 are provided at the top and bottom of the stack, these strips being further insulated from the nuts 5, 5' by the insulating washers 8, 9. Electrically conductive washers 10 between neighboring cells and contact plates of the series complete the electric circuit through the stack.

The structure of an individual integral rectifier cell is shown in Figs. 3 and 4. A metal base electrode 11, Fig. 3, which may consist of iron or aluminum coated with a thin film of bismuth is provided with an integral layer of selenium 12, for example, by the method and apparatus described in Hewlett Patents 2,334,554 of November 16, 1943, and 2,354,521 of July 25, 1944. A suitable counter-electrode upon the selenium layer 12 is applied by any convenient method, for example, by spraying thereon a soft solder (lead-bismuth-cadmium) or other low melting alloy.

As shown in Fig. 3 the application of the counter electrode in cells embodying my invention occurs in two stages. A foundation layer 13 of metal first is applied upon the selenium. Thereupon a layer or strip 14 of insulating material is applied, and finally a second or top layer 15 of metal is applied over the insulating strip and the foundation layer. The collector electrodes 2 make electrical contact with said top layer 15.

An insulating ring applied to selenium cells of 4⅜" diameter may have an inside diameter of 2⅝" and an outside diameter of 3¼". The contact or collector electrodes 2 may have a diameter of 2⅞" under pressure when assembled. In some cases a collector electrode may be soldered or welded to the counter electrode of the cell for which it serves as a terminal.

As shown in Fig. 1 the contact pressure of the contact springs is applied upon the region of the sprayed counter electrode lying directly over the insulating layer 14. The latter may consist of suitable non-conducting varnish or paint or a suitable annular washer of other insulating material, for example, paper, cellulose acetate, mica or other thin insulating material may be cemented on the first layer of sprayed counter electrode metal. A suitable material, for example, is paper coated with polystyrene resin.

The insulating ring 14 prevents disturbance of the rectifier characteristics by the collector electrodes even when under pressure while at the same time utilizing the entire area of the selenium as a current-carrying medium. The current instead of being localized under the collector electrode is desirably distributed over the surface of the selenium.

As shown in Fig. 3 only the local area of insulating strip 14 need be covered with the second coat 15 of spray-applied metal. The outer layer 15 may be chosen of metal which will be non-corrosive when in contact with the collector electrode. For example, both the outer coat 15 and the collector electrode 2 may consist of copper.

It is advantageous in some cases to apply a coat of suitable protective varnish 16 over the surface of the rectifier cells except for a contact area 17 of the counter electrode lying over the insulating ring 14.

What I claim as new and desire to secure by Letters Patent of the United States is:

1. A self-contained alternating current rectifier cell comprising the combination of a plate-shaped base electrode, a film of selenium coating one surface thereof, a counter-electrode coating the surface of said film which is opposite said base electrode, a ring-shaped layer of insulating material on said counter-electrode, a coating of metal over said layer of insulating material and at least a portion of said counter-electrode to define a cell contact area overlying said insulating material, and an external coating of insulating material upon all the exposed surface of said rectifier cell except said contact area.

2. A self-contained rectifier cell comprising the combination of a base electrode, a layer of selenium coated on a surface thereof, a counter-electrode of soft solder superimposed on said selenium layer, a layer of insulating material overlying a portion of said solder counter-electrode, and a coating of copper overlying said insulating material and at least a portion of said solder adjacent said insulating material thereby to define a contact area of said cell.

3. An integral alternating current rectifier plate of fixed construction comprising the combination of a pair of juxtaposed cooperating metal electrodes, an integral film of selenium therebetween, and a thin layer of insulating material completely and fixedly imbedded in one of said metal electrodes in flatwise relation to said selenium film, said insulating layer having a surface area smaller than the surface area of the electrode in which it is imbedded and defining a contact area on said one surface area.

4. An integral rectifier plate comprising the combination of a plate-shaped metal base electrode, an integral layer of selenium fixed to one of the surfaces thereof, an integral counter-electrode coating overlying and adhering to said selenium layer, and a thin layer of insulating material of less surface area than the surface area of said counter-electrode coating completely and fixedly imbedded in said coating in flatwise relation with said selenium layer thereby to define a contact area of said plate.

EDGAR A. HARTY.

REFERENCES CITED

The following references are of record in the file of this patent:

UNITED STATES PATENTS

| Number | Name | Date |
|---|---|---|
| 2,134,131 | Kipphan | Oct. 25, 1938 |
| 2,182,377 | Guanella | Dec. 5, 1939 |
| 2,345,122 | Herrmann | Mar. 28, 1944 |
| 2,434,960 | Richards | Jan. 27, 1948 |